July 26, 1960   S. E. ANDERSON   2,946,170
CONVEYOR MEANS FOR CORN HARVESTER
Filed Nov. 18, 1957   4 Sheets-Sheet 1

INVENTOR.
Sidney E. Anderson
BY
C. T. Parker and W. A. Murray
Attorneys

July 26, 1960  S. E. ANDERSON  2,946,170
CONVEYOR MEANS FOR CORN HARVESTER
Filed Nov. 18, 1957  4 Sheets-Sheet 2

INVENTOR.
Sidney E. Anderson
BY
Attorneys

July 26, 1960  S. E. ANDERSON  2,946,170
CONVEYOR MEANS FOR CORN HARVESTER
Filed Nov. 18, 1957  4 Sheets-Sheet 3

INVENTOR.
Sidney E. Anderson
BY
C.T. Parker and W.A. Murray
Attorneys

July 26, 1960 S. E. ANDERSON 2,946,170
CONVEYOR MEANS FOR CORN HARVESTER
Filed Nov. 18, 1957 4 Sheets-Sheet 4

INVENTOR.
Sidney E. Anderson
BY
Attorneys

United States Patent Office 2,946,170
Patented July 26, 1960

2,946,170

CONVEYOR MEANS FOR CORN HARVESTER

Sidney E. Anderson, Polk City, Iowa, assignor, by mesne assignments, to Deere & Company, a corporation of Delaware Filed Nov. 18, 1957, Ser. No. 697,278

15 Claims. (Cl. 56—18)

This invention relates to a corn harvester and more particularly to the conveyor means in the harvester which feeds the corn from the harvester mechanism to the husking or corn treating mechanism.

Generally speaking, the present invention pertains to an improvement in the corn harvester attachment shown and described in the U.S. Patent 2,794,307 issued to Charles S. Morrison, Henry H. Denison and Frank D. Jones and which operated in conjunction with a combine. However, it should be understood that the improvement would be adaptable to other types of corn harvesters.

In the type of corn harvester herein to be described and set forth in the aforesaid U.S. Patent 2,794,307, there is provided a rear crop or corn treating unit mounted on a mobile frame which operates in conjunction with a pair of transversely spaced forwardly extending row units which operate to harvest the corn from adjacent rows of stalks and feed it inwardly to a centrally located conveyor system which in turn feeds the corn to the corn treating unit. The conveyor system is comprised generally of a pair of substantially parallel augers and associated auger housings which collect the ears of corn and other incidental trash created in the harvesting operation and feeds them rearwardly to the mouth of the corn treating unit. In the type of harvester shown in the Morrison et al. patent and which is presently a commercial model, there is provided a bulwark or styling between the inner sides of the augers which prevents ears and trash from moving from one auger housing to the other. In actual operation of a unit of this nature it has become apparent, due to both the rate of movement forwardly of the entire harvester as well as the vigorous action of the harvesting mechanism, that a considerable amount of trash is collected in the augers and with the styling or bulwark extending upwardly above the augers, much of the trash is prevented from entering the auger housings. Also, in many instances the ears of corn harvested are thrown with considerable force into the auger housings and will hit against the bulwark to be deflected out of the auger housings and back onto the harvesting mechanism where they may be deflected out of the harvester and onto the ground. Mainly, however, the main purpose of the present invention is to eliminate the trash from the harvesting unit by permitting it to enter into the auger housings where it will be fed to the corn treating unit. It is contemplated, that the present harvester will operate as an attachment used in conjunction with a combine and consequently considerable trash may be admitted into the combine without effecting the operational efficiency of the combine.

It is therefore the primary object of the present invention to provide a conveying system between the pair of row units and the combine or corn treating unit which features a pair of troughs, each having an outer edge over which the corn from the row units is received and an inner edge adjacent to the inner edge of the other trough. The inner edges of the troughs are joined together by a relatively low juncture plate. Seated in the troughs are a pair of augers which operate in conjunction with the troughs to feed the corn rearwardly to the mouth of the combine. The spiral flights of the augers extend upwardly beyond the juncture plate and the inner edges of the troughs and are exposed to one another across the juncture. In a conveyor system of this type, trash from one of the harvester or row units may fall across both the upper halves of both the augers, and both augers will operate together to feed the stalks or trash rearwardly. Likewise, should momentary large quantities or ears of corn and trash accumulate in one of the auger troughs, there will be a natural tendency for the auger to feed the ears and trash across the relatively low juncture between the troughs and into the opposite or other auger troughs. In effect, therefore, the present system operates to reduce or eliminate the conditions which tend to create a plugged condition in the row or harvester units.

It is also a main object of the present invention to further improve the above described conveying system by providing an additional aggressive means positioned above and centrally relative to the pair of augers in the troughs. The additional means will be, in one form of the invention, a third auger above and parallel to the pair of augers, and in another form of the invention a transverse rotation element above and across both augers. All forms of the invention will operate to increase the effectiveness of moving trash rearwardly and out of the general location of the row or harvesting units. The trash removing effectiveness of the additional means will be considerably more than the single two-auger system. The additional aggressive means will be considered as a part of the central conveying system spaced vertically from the parallel augers or other part of the conveyor system.

Other objects and advantages of the invention will become apparent to those skilled in the art as the nature of the invention is better understood following the complete disclosure set forth in the following specification and as shown in the accompanying drawings.

Figure 1:
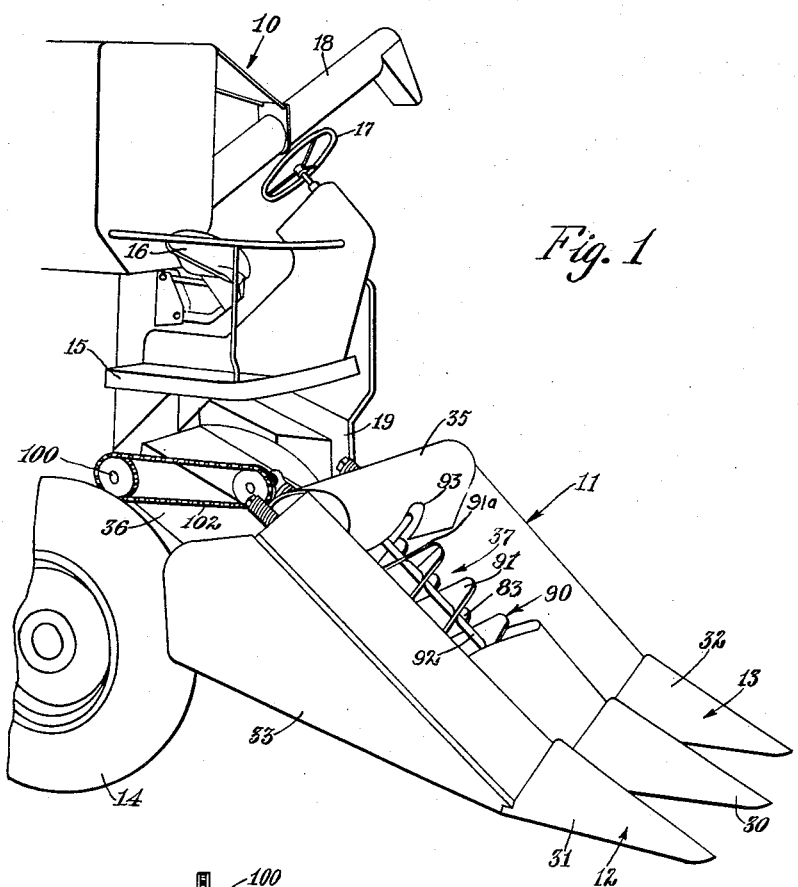
Fig. 1 is a right-side perspective of the corn harvester attachment and the forward portion of the combine.

Referring now to Fig. 1, the entire harvesting unit is composed of a rear crop treating unit, here in form of a combine 10, and a forward extending corn harvester attachment 11 having a pair of transversely spaced forwardly extending row units 12, 13. While the present contemplated environment includes a combine as the corn treating unit, it should be recognized that any type of corn treating unit, either in the form of a husking, shelling, or other type mechanism would operate in conjunction with the present type of corn picking attachment. Therefore, it should be recognized that the present arrangment of combine and corn picking attachment is for illustration purposes only.

The combine 10 includes provision for mobility by providing a mobile frame which is carried on supporting wheels, one being indicated on the front right side at 14. The combine 10 is self-propelled, containing therein both a main power source for moving the combine over the field and for operating the various mechanism of the entire unit. The combine 10 includes an operator's station 15 characterized by a seat 16 and a steering mechanism 17. A discharge elevator 18 and a mounting ladder 19 are also parts of the combine. Other characteristics of the combine are generally conventional and are not needed to be described for purposes of clearly understanding the present invention. Consequently, such details have purposely been omitted.

The harvester 11 includes a central divider 30, a right hand outer divider 31, a left hand outer divider 32, right and left hand side sheets 33, 34, and a transverse shield or hood 35 which interconnects the rear end of the outer dividers 31, 32. Extending rearwardly from the forward harvesting units is a conveyor housing structure 36 which serves as a rear housing structure for the central conveying system, later to be described in detail. The housing 36 is mounted or connected to the forward end of the combine 10 and serves to feed material into a forward opening of the combine.

To the extent so far described, the combine and corn harvester is substantially identical to that shown and described in the Morrison et al. Patent 2,794,307. Also, details of the exact manner in which the harvester attachment is mounted on the combine is set forth clearly in that patent and such will not be repeated since reference to that patent may be made if details are desired.

Harvesting mechanism 40, 41 is mounted in each of the row units 12, 13 respectively. The harvesting mechanisms 40, 41 are comprised of gathering chains 42, 43 and 44, 45 positioned on opposite sides of the stalk passage, and snapping bars 46, 52 on the right harvesting mechanism 40 and 47, 54 on the left harvesting mechanism 41, and cooperating snapping rolls 48, 49 and 50, 51 which operate to draw the stalks downwardly to cause the ears to be severed upon their coming into contact with the respective snapping bars 46, 52 and 47, 54. This type of snapping mechanism is conventional on several types of corn harvesters and no claim is herein sought to be made, but description is made for purposes of orientation. Adjacent metal plates or sheets 60, 61 are inclined downwardly and inwardly from the upper and rear ends of the harvesting mechanisms 40, 41 so as to feed the material harvested into the central conveyor system 37.

The central conveyor means or system 37 is comprised of a pair of troughs 70, 71, the right trough 70 having an outer edge 72 adjacent the outer harvesting mechanism 40 and more particularly adjacent to the sheet 60, and the left trough 71 having an outer edge 73 adjacent to the left hand harvesting mechanism 41 and more particularly to the inner side of the sheet plate 61. Inner edges 74, 75 of the troughs 70, 71 are adjacent to one another and are interconnected at a relatively low junction, 76, the junction 76 being an arcuate shaped plate overlapping the edges 74, 75.

Seated in the troughs 70, 71 are a pair of flight type conveyors in the form of augers 80, 81 respectively having spiral flights 82, 83 mounted on central drive shafts 84, 85. The upper portions of the flights 82, 83 are above the junction 76 so that the upper portions of the flights are exposed to one another across the junction. The augers 80, 81 extend into and through the central conveyor housing 36 and feed material into the opening at the forward end of the combine.

In the form of the invention shown in Figs. 1–5, there is a third auger 90 positioned centrally between and above the lower augers 80, 81. The upper auger 90 is composed of a spiral flight 91 mounted on a drive shaft 92. The auger 90 extends only the length of the opening between the rear end of the central divider housing 30 and the transverse shield 35. A suitable cutout 93 is provided in the transverse shield 35 so as to permit the auger 90 to extend slightly rearwardly of the forward shield portion of the transverse shield 35. The rear of the auger shaft 92 is supported by a suitable journal 94 which is fixed to an upright plate 95 fixed to the conveyor housing 36. A rear portion 91a of the auger flight 91 feeds in an opposite direction than the main portion and operates to deflect material forwardly and downwardly at the rear portion.

Figure 5:
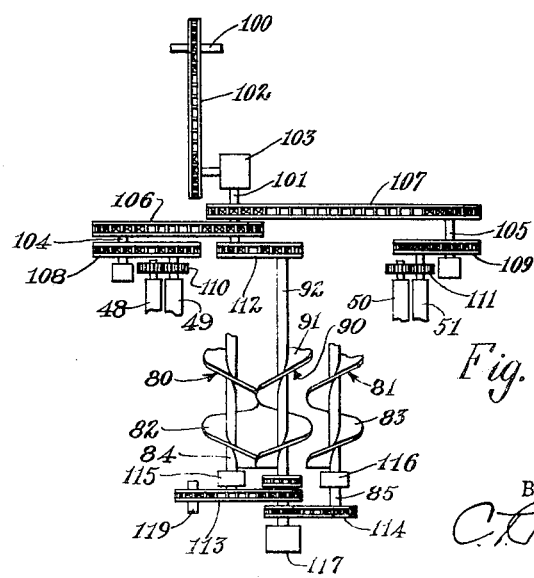
Fig. 5 is a general schematic view of the drive for operating the conveying and harvesting system.
Figure 2:
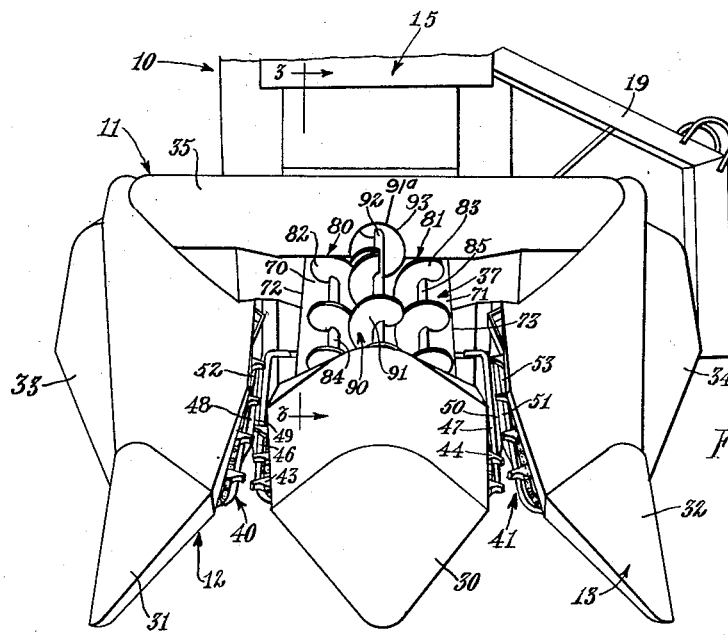
Fig. 2 is a front perspective of the harvester attachment and a portion of its associated combine.
Figure 3:
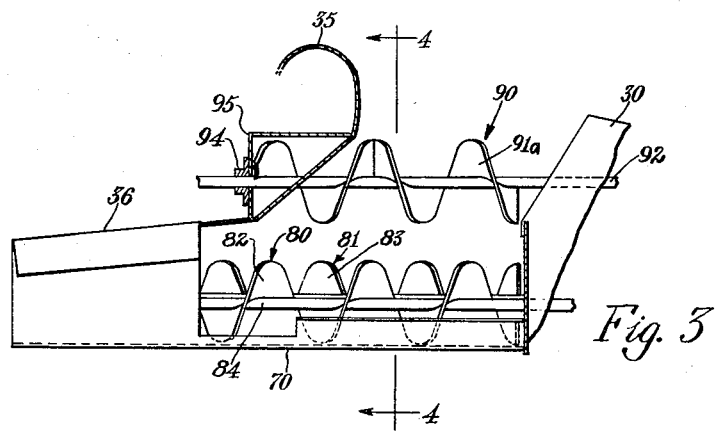
Fig. 3 is an enlarged sectional view taken along the lines 3—3 of Fig. 2.
Figure 4:
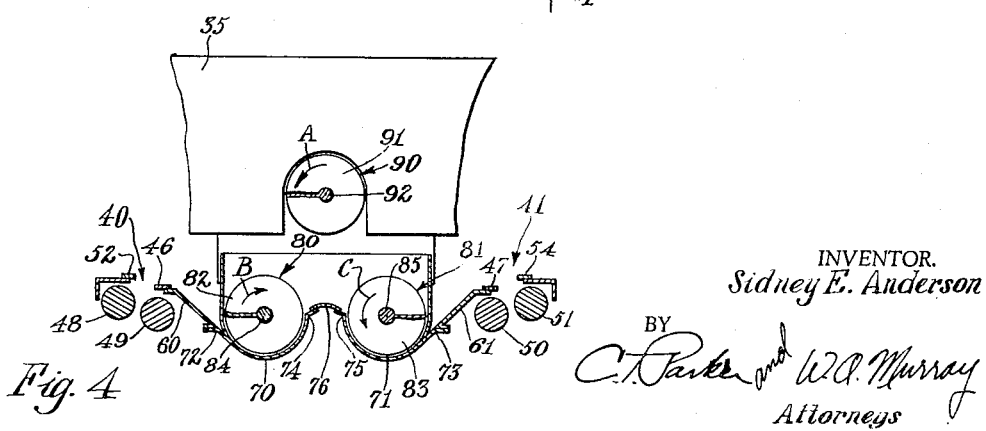
Fig. 4 is a sectional view taken substantially along the line 4—4 of Fig. 3.

Referring now to Fig. 5, the drive mechanism for operating the augers as well as other mechanisms within the harvesting unit is shown schematically. Power initially comes from the main power source of the combine through a primary drive shaft 100 and is transmitted to a harvester drive shaft 101 by a suitable chain drive 102 and a gear transmission, indicated in its entirety by reference numeral 103. The harvester drive shaft 101 drives outer counter drive shafts 104, 105 by means of transverse chain drives 106, 107 respectively. From the counter shafts 104, 105 the snapping rolls 48, 49 and 50, 51 are driven by means of a chain drive 108, 109 respectively in cooperation with spur gear drives 110, 111 which operates to rotate the individual snapping rolls. A chain drive 112 extends upwardly from the harvester drive shaft 101 to the upper auger drive shaft 92 and operates to drive the upper auger 90 in a counter clockwise direction as indicated by the arrow A (Fig. 4). The outer augers 80, 81 are driven from the forward end of the drive shaft 92 by means of chain drives 113, 114, the chain drive 113 having an idler sprocket and shaft 119 which causes the auger 80 to rotate in a clockwise direction as indicated by the arrow B (Fig. 4). The auger 81 rotates in a counter clockwise direction as indicated by the arrow C. Suitable journal boxes 115, 116, 117 are provided in the forward portion of the harvester to support the shafts 84, 85 and 90 respectively.

In operation, the harvesting mechanism operates in the following manner. As the entire unit moves over the field, adjacent rows of corn stalks will enter into the row units 12, 13 where the snapping rolls 48, 49, 50, 51 operate to draw the stalks downwardly to cause the ears to contact the snapping bars 46, 52, 47, 54. The ears are guided into the troughs 70, 71 by means of the relative inclined relation between the snapping bars 46, 52, and 42, 54 and by the side sheets or plates 60, 61. Likewise, stalks and other trash in the harvesting mechanism would tend to gravitate inwardly and downwardly into the auger system. Broken stalks and/or large pieces of trash will bridge between the flights of the augers 80, 81, and 90 and through the cooperative effort of all three of the augers will be driven rearwardly and out of the immediate vicinity or area where the ears of corn are being fed into the central conveyor system. As mentioned previously, the normal combine is quite capable of handling a considerable amount of trash without clogging or otherwise injuring the combine mechanisms. Consequently, trash moved into the combine by the auger system will move through the combine and be discharged as waste material. Therefore, by exposing the flights of the augers to one another, the augers will act as trash removers at the rear end of the harvesting mechanism. Also, by a relatively low junction 76 between the inner edges 74, 75 ears of corn and trash from either of the harvesting mechanisms 40, 41 may be cleared or conveyed from the harvesting area by either of the augers 80, 81 since a flow of material from one auger trough to the other is permitted. Thus, should one of the augers become clogged with ears or trash the other two augers will operate as cleaning mechanism for the clogged auger.

Figure 6:
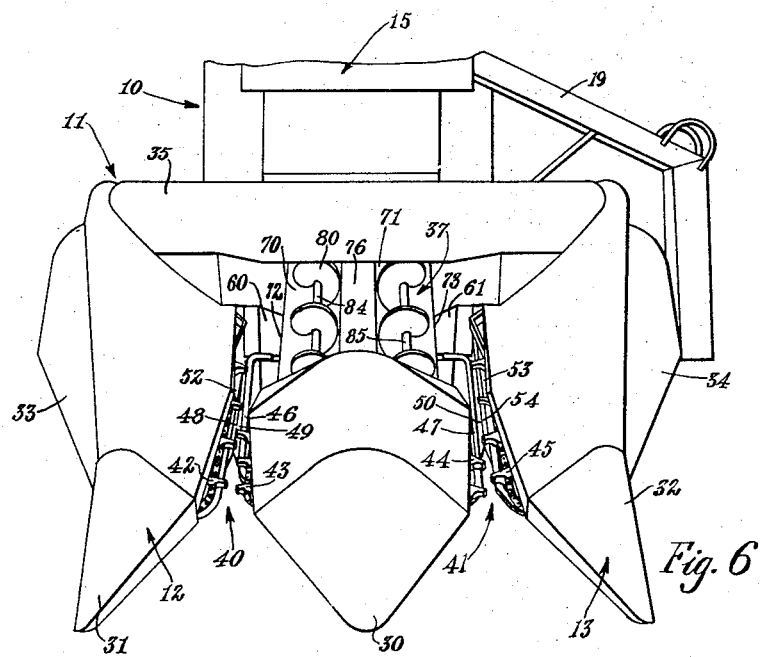
Fig. 6 is a view similar to Fig. 2 showing a two-auger conveying system and its associated styling.
Figure 7:
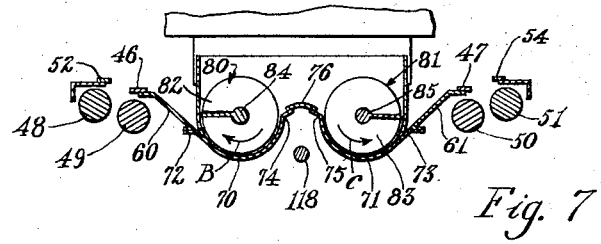
Fig. 7 is an enlarged sectional view similar to Fig. 4 of the form of conveyors used in Fig. 6.

In the form of the invention shown in Fig. 6 the entire mechanism is similar to that of the form already described with the exception that the third or upper auger 90 is eliminated. Therefore, the augers and its associated trough structure are given identical reference numbers. The modification is further changed by eliminating the upper drive shaft 92 and replacing it with a lower drive shaft 118 which is positioned beneath the junction 76 and within the harvester housing. The drive for the outer auger 80, 81 and the modification shown in Figs. 6 and 7 would be identical to that of the previous form of the invention with the exception that the drive shaft 118 would be driven from the drive shaft 101 (Fig. 5) by means of a chain drive which extended downwardly from the drive shaft 101 to accommodate the lower position of the drive shaft 118 as compared to the relatively high position of the auger drive shaft 92 of the previous form of the invention.

In this form of the invention, the harvesting mechanism operates in substantially the same manner as in the previous form. Ears of corn from either of the harvesting mechanisms may be received in either of the auger troughs 70, 71 and trash accumulated in one of the auger troughs if becoming of sufficient quantity will move into the opposite trough and consequently the auger in that trough will operate to aid in cleaning the area of the accumulated trash. Likewise, large pieces of trash such as stalks will bridge between them flights 82, 83 and both augers will operate to clear it from the area. Therefore, by providing the relatively low junction 76 between the inner edges 74, 75 of the auger trough, the movement of material between the adjacent auger troughs 70, 71 is permitted and maximum efficiency in operation of both augers is permitted to eliminate trash and corn from either of the harvesting mechanism 40, 41.

Figure 9:
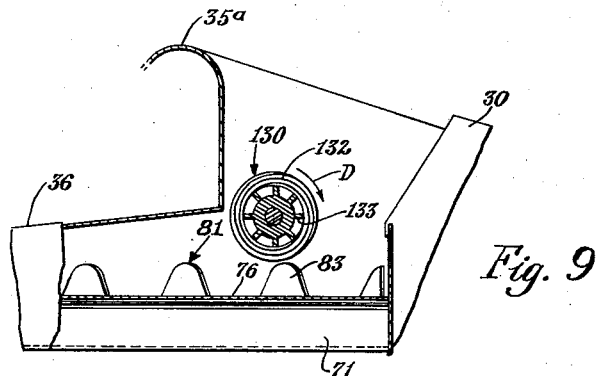
Fig. 9 is a sectional view taken along the line 9—9 of Fig. 8.
Figure 10:
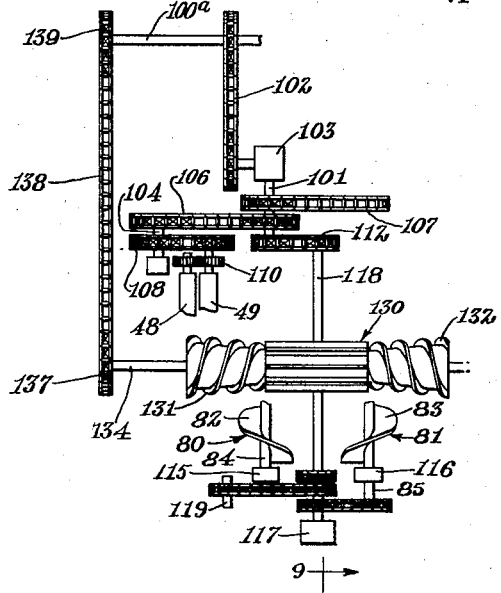
Fig. 10 is a schematic view of the drive for operating the system in the modification of Figs. 8, 9.
Figure 8:
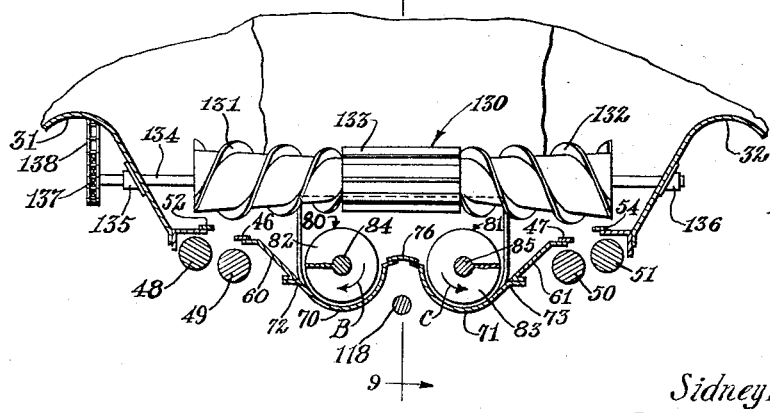
Fig. 8 is a sectional view somewhat similar to Fig. 4 showing a modification of the invention.

In the form of the invention shown in Figs. 8–10, there is an additional aggressive means provided above the augers 80, 81 and adjacent the rear end of the picking area which will operate to drive the trash first inwardly from the extreme upper ends of the snapping area. As in the previous forms of the invention similar structure to that already described are given identical reference numbers. The proposed aggressive means of this modification comprises a transverse rotatable element, indicated in its entirety by the reference numeral 130, mounted forwardly of transverse shielding 35a and having its opposite outer ends in the form of a pair of auger flights 131, 132, and an integral or rigidly mounted central paddle wheel section 133 connecting inner opposite ends of the auger flights 131, 132. The flights on the wheel section 133 are above the augers 80, 81 and are exposed to the flights 82, 83. As may be seen from Figs. 8–10 the auger flights 131, 132 extend from a position substantially adjacent to the snapping bars 52, 46 and 47, 54 inwardly to a position substantially above the fore and aft extending augers 80, 81. The auger flight sections 131, 132 are tapered from their outer to their inner ends, the outer ends being adjacent to the outer snapping bars 52, 54.

The rotatable element 130 is supported on a transverse drive shaft 134 which extends through the inner styling of the outer dividers 31, 32 and are supported on the styling by means of bearing supports 135, 136. The transverse element 130 is fixed to rotate in unison with the shaft 134.

The drive mechanism for operating the aggressive trash removing element 130 is shown in Fig. 10 and comprises a sprocket 137 fixed to the shaft 134, and a rearwardly extending chain 138 which is carried over a rear sprocket 139. A main drive shaft 100a, operative from the power source on the combine, is extended outwardly and has the sprocket 139 mounted thereon. With the exception of the additional drive 137—139, and the extended drive shaft 100a, the drive for the corn picking unit is substantially identical to the previous forms of the invention as is indicated by the identical reference numbers being shown on the identical parts.

The modified form of the invention operates in the following manner. As the stalks are fed rearwardly through the stalk passages the ears of corn will be snapped or removed from the stalks. In the process of harvesting the ears, many stalks would be broken and carried with other trash rearwardly. The stalks and trash, upon reaching the augers 131, 132 will aggressively be driven inwardly over the ear augers 80, 81 where they will be fed rearwardly into the combine by the flights on the paddle wheel portion 133. The paddle wheel portion 133 will serve to start the trash in its rearward movement and will also operate to press the trash into a position where it is contacted by the flights 82, 83.

What is claimed, therefore, and desired to be secured by Letters Patent is:

1. On a corn harvester movable forwardly over a field of row planted corn of the type having a rearwardly disposed crop treating unit mounted on a main frame and a pair of transversely spaced forwardly extending row units adapted to harvest corn from adjacent rows of stalks and to feed the corn inwardly, conveying means moving the corn rearwardly from the row units to the corn treating unit comprising: a pair of fore-and-aft extending troughs supported by the main frame adjacent to and transversely inwardly of the respective row units, each of the troughs having an outer edge positioned adjacent to and for receiving the corn from its respective adjacent row unit and an inner edge adjacent the inner edge of the other trough; a junction interconnecting the inner edges; a pair of augers having lower portions seated in the troughs and upper portions exposed to one another across the junction, the upper portions including at least that portion of the augers above the axes of the augers; and a third auger supported by the main frame positioned centrally between, above, and proximate to the pair of augers.

2. On a corn harvester movable forwardly over a field or row planted corn of the type having a rearwardly disposed crop treating unit mounted on a main frame and a pair of transversely spaced forwardly extending row units adapted to harvest corn from adjacent rows of stalks and to feed the corn inwardly, conveying means moving the corn rearwardly from the row units to the corn treating unit comprising: a pair of fore-and-aft extending troughs supported by the main frame adjacent to and transversely inwardly of the respective row units, each of the troughs having an outer edge positioned adjacent to and for receiving the corn from its respective adjacent row unit and an inner edge adjacent the inner edge of the other trough; a junction interconnecting the inner edges; and a pair of flight type conveyors seated in the troughs and having upper portions of their flights exposed to one another across the junction.

3. On a corn harvester movable forwardly over a field of row planted corn of the type having a rearwardly disposed crop treating unit mounted on a main frame and a pair of transversely spaced forwardly extending row units adapted to harvest corn from adjacent rows of stalks and to feed the corn inwardly, conveying means moving the corn rearwardly from the row units to the corn treating unit comprising: a pair of fore-and-aft extending troughs supported by the main frame adjacent to and transversely inwardly of the respective row units, each of the troughs having an outer edge adjacent its respective adjacent row unit and an inner edge adjacent the inner edge of the other trough; a junction interconnecting the inner edges; and flight type conveying means including at least a pair of augers seated in the troughs having their upper portions exposed to one another across the junction for feeding material rearwardly to the crop treating unit.

4. On a harvester movable forwardly over a field of row planted crops of the type having a rearwardly disposed crop treating unit mounted on a main frame and a pair of transversely spaced forwardly extending harvesting row units adapted to harvest material from adjacent rows of plants and to feed the material inwardly, conveying means moving the material rearwardly from the row units to the crop treating unit comprising: a pair of fore-and-aft extending troughs supported by the main frame adjacent to and transversely inwardly of the respective row units, each of the troughs having an outer edge adjacent its respective adjacent harvesting unit and an inner edge adjacent the inner edge of the other trough; a junction interconnecting the inner edges; and a plurality of conveyors, said conveyors having flight portions exposed to one another to afford material communication between the flight portions of the conveyors, said conveyors including a pair of augers seated in the troughs and exposed to one another across the junction, and a third auger supported by the main frame positioned centrally between, above and proximate to the pair of augers.

5. On a harvester movable forwardly over a field of row planted crops of the type having a rearwardly disposed crop treating unit mounted on a main frame and a pair of transversely spaced forwardly extending harvesting row units adapted to harvest material from adjacent rows of plants and to feed the material inwardly, conveying means moving the material rearwardly from the row units to the crop treating unit comprising: a pair of fore-and-aft extending troughs supported by the main frame adjacent to and transversely inwardly of the respective row units, each of the troughs having an outer edge adjacent its respective adjacent harvesting unit and an inner edge adjacent the inner edge of the other trough; a junction interconnecting the inner edges; and a plurality of conveyors, each of the conveyors having flight portions exposed to and proximate to the flight portions of the other conveyors to afford material communication between the flight portions, and including a pair of augers seated in the troughs and exposed to one another across the junction, and a third rotatable conveyor supported by the main frame positioned above and proximate to the pair of augers.

6. On a harvester movable forwardly over a field of row planted crops of the type having a rearwardly disposed crop treating unit mounted on a main frame and a pair of transversely spaced forwardly extending harvesting row units adapted to harvest material from adjacent rows of plants and to feed the material inwardly, conveying means moving the material rearwardly from the row units to the crop treating unit comprising: a pair of fore-and-aft extending troughs supported by the main frame adjacent to and transversely inwardly of the respective row units, each of the troughs having an outer edge adjacent its respective adjacent harvesting unit and an inner edge adjacent the inner edge of the other trough; a junction interconnecting the inner edges; and a plurality of conveyors, each of the conveyors having flight portions exposed to and proximate to the flight portions of the other conveyors to afford material communications between the flight portions, and including a pair of augers seated in the troughs and exposed to one another across the junction, and a transverse rotatable element supported by the main frame positioned above and proximate to the pair of augers and having flight means on the element operative to engage the material for aiding its movement to the crop treating unit.

7. The invention defined in claim 6 in which the transverse rotatable element is in the form of an elongated member having peripheral spiral flights at opposite outer ends thereof and adjacent the row units for feeding material from the row units inwardly to the fore and aft extending augers and a paddle type central section vertically alined with the pair of augers and operative to feed material under the paddle section into contact with the pair of augers.

8. The invention defined in claim 7 further characterized by the outer sections being tapered from their outer ends to the central section.

9. On a harvester movable forwardly over a field of row planted crops of the type having a rearwardly disposed crop treating unit mounted on a main frame and a pair of transversely spaced forwardly extending harvesting units adapted to harvest material from adjacent rows of plants and to feed the material inwardly, conveying means moving the material rearwardly from the row units to the crop treating unit comprising: a pair of fore-and-aft extending troughs supported by the main frame adjacent to and transversely inwardly of the respective row units, each of the troughs having an outer edge adjacent its respective adjacent harvesting unit and an inner edge adjacent the inner edge of the other trough; a junction interconnecting the inner edges; and a plurality of conveyors, each of the conveyors having flight portions exposed to and proximate to the flight portions of the other conveyors to afford material communication between the flight portion, and including a pair of augers seated in the troughs and exposed to one another across the junction.

10. On a corn harvester movable forwardly over a field of row planted corn of the type having a rearwardly disposed crop treating unit mounted on a main frame and a pair of transversely spaced forwardly extending row units adapted to harvest corn from adjacent rows of stalks and to feed the corn inwardly, conveying means moving the corn rearwardly from the row units to the corn treating unit comprising: fore-and-aft extending trough means supported by the main frame adjacent to and transversely inwardly of the respective row units, the trough means having outer edges adjacent the respective harvesting units; transversely spaced augers seated in the trough means, said augers having flights therein exposed to one another to permit free flow of material between the flights and over the trough means and a third auger supported by the main frame positioned centrally between, above, and proximate to the transversely spaced augers.

11. On a corn harvester movable forwardly over a field of row planted corn of the type having a rearwardly disposed crop treating unit mounted on a main frame and a pair of transversely spaced forwardly extending row units adapted to harvest corn from adjacent rows of stalks and to feed the corn inwardly, conveying means moving the corn rearwardly from the row units to the corn treating unit comprising: fore-and-aft extending trough means supported by the main frame adjacent to and transversely inwardly of the respective row units, the trough means having outer edges adjacent the respective harvesting units; transversely spaced augers seated in the trough means, said augers having flights therein exposed to one another to permit free flow of material between the flights and over the trough means and a rotatable element supported by the main frame positioned above, and proximate to the transversely spaced augers and having flight means thereon cooperative with flights on the augers for moving material rearwardly.

12. The invention defined in claim 11 in which the rotatable element is transverse of the trough means and is operative to move material into engagement with the transversely spaced augers for movement rearward.

13. On a corn harvester movable forwardly over a field of row planted corn of the type having a rearwardly disposed crop treating unit mounted on a main frame and a pair of transversely spaced forwardly extending row units adapted to harvest corn from adjacent rows of stalks and to feed the corn inwardly, conveying means moving the corn rearwardly from the row units to the corn treating unit comprising: fore-and-aft extending trough means supported by the main frame adjacent to and transversely inwardly of the respective row units, the trough means having outer edges adjacent the respective harvesting units and transversely spaced augers seated in the trough means, said augers having flights thereon exposed to one another to permit free flow of material between the flights and over the trough means.

14. On a corn harvester movable forwardly over a field of row planted corn of the type having a rearwardly disposed crop treating unit mounted on a main frame and a pair of transversely spaced forwardly extending row units adapted to harvest corn from adjacent rows of stalks and to feed corn inwardly, conveying means moving the corn rearwardly from the row units to the corn treating unit comprising: fore-and-aft extending trough means supported by the main frame adjacent to and transversely inwardly of the respective row units, the trough means having outer edges adjacent the respective harvesting units; and transversely spaced flight type conveyors seated in the trough means, said conveyors having flights exposed to one another to permit free flow of material between the flights and over the trough means.

15. On a corn harvester movable forwardly over a field of row planted corn of the type having a rearwardly disposed crop treating unit mounted on a main frame and a forwardly extending row unit adapted to harvest corn from a row of stalks, and to feed the corn to one side of the harvesting unit, conveying means moving the corn rearwardly from the row unit to the corn treating unit comprising: fore-and-aft extending trough means supported by the main frame adjacent to and transversely inwardly of the row unit having an outer edge spaced from and an inner edge adjacent the harvesting unit; a plurality of flight type conveyors, part of which is seated in the trough means and part of which is spaced vertically from and proximate the former part, and said flight type conveyors having flights thereon to afford interflow of material therebetween and being cooperative to effect movement of material rearwardly.

References Cited in the file of this patent

UNITED STATES PATENTS

| | | |
|---|---|---|
| 1,821,985 | Peterson | Sept. 8, 1931 |
| 1,880,840 | Currier | Oct. 4, 1932 |
| 1,906,692 | Lindgren et al. | May 2, 1933 |
| 2,491,777 | Smith | Dec. 20, 1949 |
| 2,731,969 | Hoeksema | Jan. 24, 1956 |
| 2,794,307 | Morrison et al. | June 4, 1957 |

FOREIGN PATENTS

| | | |
|---|---|---|
| 17,236 | Australia | Dec. 5, 1929 |
| 533,400 | Canada | Nov. 20, 1956 |